: US 7,409,096 B2
(45) Date of Patent: Aug. 5, 2008

(54) PROCESS AND FUNCTIONAL UNIT FOR THE OPTIMIZATION OF DISPLAYING PROGRESSIVELY CODED IMAGE DATA

(75) Inventor: Uwe-Erik Martin, OT Prädikow (DE)

(73) Assignee: Siemens Aktiengesellschaft, Munich (DE)

( * ) Notice: Subject to any disclaimer, the term of this patent is extended or adjusted under 35 U.S.C. 154(b) by 784 days.

(21) Appl. No.: 10/865,596

(22) Filed: Jun. 10, 2004

(65) Prior Publication Data

US 2005/0008234 A1      Jan. 13, 2005

(30) Foreign Application Priority Data

Jun. 10, 2003    (DE) ................................ 103 26 168

(51) Int. Cl.
 *G06K 9/36* (2006.01)
(52) U.S. Cl. ........................ 382/233; 382/232; 382/248
(58) Field of Classification Search .......... 382/232–253
See application file for complete search history.

(56) References Cited

U.S. PATENT DOCUMENTS

| 5,724,070 | A  | * | 3/1998  | Denninghoff et al. ....... 345/547 |
| 5,861,920 | A  | * | 1/1999  | Mead et al. ............ 375/240.25 |
| 5,880,856 | A  | * | 3/1999  | Ferriere ................. 358/426.11 |
| 6,535,644 | B1 | * | 3/2003  | Kurapati ..................... 382/240 |
| 6,606,413 | B1 | * | 8/2003  | Zeineh ....................... 382/232 |
| 6,804,403 | B1 | * | 10/2004 | Wang et al. ................. 382/240 |
| 7,136,532 | B2 | * | 11/2006 | Van Der Schaar ........... 382/233 |
| 7,139,794 | B2 | * | 11/2006 | Levanon et al. ............. 709/203 |
| 7,187,802 | B2 | * | 3/2007  | Ju .............................. 382/233 |
| 7,206,804 | B1 | * | 4/2007  | Deshpande et al. ......... 709/203 |
| 7,221,804 | B2 | * | 5/2007  | Atsumi et al. ............... 382/239 |
| 2003/0128878 | A1 | * | 7/2003 | Leannec et al. ............. 382/233 |
| 2004/0001635 | A1 | * | 1/2004 | Van Der Schaar ........... 382/233 |
| 2004/0008894 | A1 | * | 1/2004 | Zeineh ....................... 382/240 |
| 2004/0146209 | A1 | * | 7/2004 | Kadowaki et al. ........... 382/233 |
| 2004/0165779 | A1 | * | 8/2004 | Guillou et al. .............. 382/232 |

* cited by examiner

*Primary Examiner*—Jingge Wu
*Assistant Examiner*—Sean Motsinger
(74) *Attorney, Agent, or Firm*—Schiff Hardin LLP

(57) ABSTRACT

In a process and unit for gradual decoding, archiving and graphic display of progressively decoded image data, time intervals between the time points of consecutive decoding steps, during which network users receive ever more refined image resolution when downloading image data from a central network server to the client computer using transferred and decoded partial data quantities ΔLi as preview images, are generated with abbreviated time spans that are optimized with respect to minimization of system usage by the decoding system. For this purpose, the receiving data rates for transfer of the individual partial data quantities, which are taken into account through improvements generated by the individual decoding steps of a quality metric showing the degree of image resolution and the temporary usage of the decoding system upon determination of the decoding time points. The wait times between the time points of directly consecutive decoding steps are calculated using statistical image quality parameters of received partial image data in such a manner that the decoding steps which do not lead to a perceptible improvement in the quality of a reconstructed image are suppressed.

5 Claims, 5 Drawing Sheets

PROCESS AND FUNCTIONAL UNIT FOR THE OPTIMIZATION OF DISPLAYING PROGRESSIVELY CODED IMAGE DATA

BACKGROUND OF THE INVENTION

1. Field of the Invention

The present invention concerns a process and a unit for gradual processing and, when necessary, graphic display of progressively coded image data, which help to shorten and, with respect to minimization of system usage, optimize the time span during which network users are provided progressively refined image resolution when gradually downloading image data from a central network server to their local client computers in the form of transferred and decoded partial data quantities as preview images, for example.

2. Description of the Prior Art

The following provides a brief presentation of the principle of progressive image coding as applied within the framework of the Progressive JPEG Standard. Because the solution that forms the basis of the invention is, however, independent of the actual image coding standard and only one progressive process is assumed, other standards, e.g. JPEG 2000 or Interlaced GIF, can be used besides the Progressive JPEG Standard described here.

The file format that has come to be known as "Progressive JPEG" is an expansion of the graphic file format JPEG that can be used to gradually build and save a photographically realistic image in a Web browser. In this process, already downloaded partial data quantities $\Delta L_i$ [kByte] are decoded in several decoding steps simultaneously during downloading of the data quantity to be transferred $$L_{total} = \frac{1}{1.024} \frac{\text{MByte}}{\text{kByte}} \sum_{i=1}^{N} \Delta L_i [\text{MByte}] \quad (1)$$

of an image file from a central network server to the local client computer of a network user so that ever more detailed preview images $V_j$ of the graphic to be reconstructed can be displayed until the total image file has been downloaded from the network server. The resolution of the graphic will become gradually ever finer during the loading process and the resulting picture will be sharper until the predefined resolution RB is achieved through the quantization of the original image. An advantage of this process is that a person viewing a Web page with embedded graphic elements will get an initial visual impression of the image file when the download begins and does not have to wait until the complete image has been transferred. The goal is

- to shorten the elapsing wait time for the graphic display of useable j-th version of a preview image $V_j$ for creating an early visual impression of the downloaded image file $$T_W(j) := \sum_{i=1}^{j} \Delta t_{w,i} [s] \quad (2a)$$

so that the network user already at an early point in time ti of the loading process can have valuable image information from the data quantity transferred up to that point $$L_{ist}(j) := \sum_{i=1}^{j} \Delta L_i = L_{gas} \cdot 1.024 \frac{\text{kByte}}{\text{MByte}} \sum_{i=1}^{j} \Delta l_i [\text{kByte}] \quad (2b)$$

with $j = \{1, 2, \ldots, N\}$ made available whereby $$\Delta l_i := 100 \cdot \frac{1}{1.024} \frac{\text{MByte}}{\text{kByte}} \cdot \frac{\Delta l_i}{L_{gas}} \quad (2c)$$

which designates the percentage increase of the partial data quantity received and decoded in the decoding step $D_i$.

- to transparently display the progress of the image transfer achieved at each decoding step $D_i$ at the time points ti, which shows an improvement of the image quality, and
- controls the loading process interactively, if necessary, to cancel or continue.

In order to achieve this, the images used with progressive JPEG are split up as in the baseline JPEG process in 8×8 blocks and are transformed using the Discrete Cosinus Transformation (DCT). According to the quantification, for which parameters may be set, each block will not be coded immediately but will first be temporarily saved in a data buffer until all blocks contained in the image are quantified. The buffer content will then be coded in several steps. Therefore there is no sequential coding of the individual blocks as in the baseline JPEG process. The loading and decoding of partial data quantities for display of rough preview images with gradually refined resolution proceeds significantly faster then a line-by-line image composition for reconstructing the fine resolution of the original image.

The technical problem encountered in decoding in this context lies in the optimal determination of the time distances of two immediately consecutive decoding steps $D_{i-1}$ and $D_i$ that must be selected in such a way that the mean data reception rate R, the improvements in image quality Q achieved in the individual coding steps and the available performance capacity and the relative load (burden)

$$\rho = 100 \cdot \frac{T_D}{T_W} = 100 \cdot \frac{\sum_{i=1}^{N} \Delta t_{D,i}}{\sum_{i=1}^{N} \Delta t_{W,i}} \quad [\%] \quad (3a)$$

of the applied decoding and display system can be taken into account. In this instance, $$T_W := \sum_{i=1}^{N} \Delta t_{W,1} = t_N - t_0 \quad [s] \quad (3b)$$

designates the total required wait time from the beginning of the download process to the time $t_o = 0$ s until the display of the final version $V_n$ of maximum resolution $R_B$ of an image at time $t_N$ and $$T_D := \sum_{i=1}^{N} \Delta t_{D,i} \quad [s] \tag{3c}$$

is the total required time span for decoding and graphic visualization of this final version $V_N$, whereby $$t_D \overset{1}{\leq} T_W \tag{3d}$$

must be valid; $\underline{\Delta t_{w,i}}$ is the wait time between both decoding steps $D_{i-1}$ and $D_i$, $\underline{\Delta t}$hd $\underline{D,i}$ is the actual required computation time for decoding and graphic visualization of the partial data quantity $\Delta L_i$ and $$\rho_i = 100 \cdot \frac{\Delta t_{D,i}}{\Delta t_{W,i}} \quad [\%] \tag{3e}$$

the usage of the decoding and display system at the time interval $\Delta t_{w,i}$ which may not be greater than 100%. The following must also apply $$\Delta t_{D,i} \overset{1}{\leq} \Delta t_{W,i} \; \forall \; i. \tag{3f}$$

Conventional processes used in the current state of technology usual determine the time durations $\Delta t_{D,i}$ between the time points $t_{i-1}$ and $t_i$ of sequential decoding steps $D_{i-1}$ and $\underline{D_i}$ either independently from the received data quantity List (j) (Version 1), the decoding steps are implemented at regular time distances $\Delta t_D$ (Version 2) or use a combination of both processes (Version 3). As is explained in the following, these methods run into technologically conditioned limits.

When executing version 1, a procedure executed to determine the time distances $$\Delta t_{D,i} \equiv \Delta t_{W,i} := t_i - t_{i-1} \neq \text{const.} [s] \; (\text{for } i \in \{1,2,\ldots,N\}) \tag{4}$$

of sequential decoding processes $D_{i-1}$ and $D_i$ starts the i-th decoding $(D_i)$ and display step $(V_i)$, when an established, but variable, data quantity $\Delta L_i$ of progressively coded image data is available to the decoding and display system. So, as an example, the first decoding step $D_i$ is executed after the first block $B_1$ of progressively coded image data is received by the decoding system. The partial data quantity $\Delta L_1$ of the first block $B_1$ is thereby an optional system parameter. Further decoding steps $D_2$ through $D_n$ are implemented after further blocks $B_2$ thru $B_n$, whose sizes $\Delta L_2$ through $\Delta L_n$ depend respectively on the sizes $\Delta L_1$ through $\Delta L_{N-1}$ for the previously received blocks $B_1$ through $B_{n-1}$ and their system parameters are determined suitable, were received by the decoding system. Such a determination of the decoding distances $\Delta t_{D,i}$ takes into account the mean transfer rate $$R = 8 \frac{\text{Bit}}{\text{Byte}} \cdot \frac{L_{ges}}{T_W} \tag{5}$$

$$= 8 \frac{\text{Bit}}{\text{Byte}} \cdot \frac{1}{1.024} \frac{\text{Mbyte}}{\text{kByte}} \cdot \frac{1}{T_W} \cdot \sum_{i=1}^{N} \Delta L_i \quad [\text{Mbit/s}]$$

the total data quantity received $L_{total}$s during the time $T_w$ only indirectly via the system parameters $\Delta_{L_i}$. Then there is a slow reception of the data at long wait times $\Delta t_{w,i}$ between the decoding steps $D_{i-1}$ and $D_i$, whereas there is a fast reception of data at very short wait times $\Delta t_{w,i}$. In the latter case, the decoding processes can no longer be executed in a timely manner due to the limited performance capacity of the decoding system is some circumstances. In order to avoid this, in many systems the instant value $$R_i = 8 \frac{\text{Bit}}{\text{Byte}} \cdot \frac{1}{1.024} \frac{\text{MByte}}{\text{kByte}} \cdot \frac{\Delta L_i}{\Delta t_{D,i}} \tag{6}$$

$$(\text{for } i \in (1, 2 \ldots, N))$$

of the data rate R of received image data form a system parameter that is either regularly measured or is recognized as an estimate by the decoding system.

If, as in version 2, the display steps $V_i$ are executed in regular, constant time intervals $\Delta t_D$, the total image data quantity received at the time $t_j$ of display by the decoding and display system $$L'_{ist}(j) := j \cdot \Delta L = 1.024 \frac{\text{kByte}}{\text{MByte}} \cdot j \cdot L_{ges} \cdot \Delta l \quad [\text{kByte}] \tag{7a}$$

$$(\text{with } j \in \{1, 2, \ldots, N\}),$$

whereby $$\Delta l := 100 \cdot \frac{1}{1.024} \frac{\text{MByte}}{\text{kByte}} \cdot \frac{\Delta L}{L_{ges}} \quad [\%] \tag{7b}$$

with $\Delta L_1 = \Delta L_2 = \ldots \Delta L_i = \ldots = \Delta L_N := \Delta L$ [kByte] (7c)

the increase as a percentage of the received data and designated in the individual decoding steps as decoded constant partial data quantities $\Delta L$, will be decoded and graphically visualized. The time intervals $$t_{D,i} := t_i - t_{i-1} = \text{const.} [s] \; (\text{for } i \in \{1,2,\ldots,N\}) \tag{8a}$$

between two consecutive decoding steps $D_{i-1}$ and $\underline{D_i}$, whereby $$\Delta t_{D,1} = \Delta t_{D,2} = \ldots \Delta t_{D,i} = \ldots \Delta t_{D,N} := \Delta t_D [s] \text{ and } \Delta t_{D,} \\ 1 \leq \Delta t_{W,1} \tag{8b}$$

is valid, form a system parameter of the decoding system and also take into account the performance capacity of the decoding system. In the case of such a manner of proceeding, the data rate $$R_I = 8 \frac{\text{Bit}}{\text{Byte}} \cdot \frac{1}{1.024} \frac{\text{MByte}}{\text{kByte}} \cdot \frac{\Delta L_i}{\Delta t_{W,i}} \tag{9}$$

$$= 8\frac{\text{Bit}}{\text{Byte}} \cdot \frac{1}{1.024} \cdot \frac{\text{MByte}}{\text{kByte}} \cdot \frac{\Delta L_i}{\Delta t_W} \cdot \frac{N}{N} = 8\frac{\text{Bit}}{\text{Byte}} \cdot \frac{L_{ges}}{T_W} = R \text{ [MBit/s]}$$

(with $i \in \{1, 2, \ldots, N\}$)

of the received data will implicitly be taken into account. At a small data rate $R_i$ of a received partial data quantity $\Delta L_i$, the visual improvement of the displayed image between decoding steps $D_{i-1}$ and $D_i$ is small, whereas a high data rate $R_i$ of the received partial data quantity $\Delta L_i$ leads to a dramatic improvement $\Delta Q_i$ of the image quality Q. An overload due to the limited performance capacity of the decoding system is hereby excluded. There is a disadvantage, however, in that the usage p of the decoding system remains constant with respect to time independently of the data rates $R_i$ of the received partial data quantities $\Delta_{L_i}$ A combination of both manners of proceeding according to version 3 leads to usage of the decoding system that can be modified with respect to time.

The usage pi is dependent on the partial data quantity $\Delta L_i$ received in the time interval $\Delta t_{w,i}$.

Common to all three versions, however, is the fact that statistical and visual properties of a transferred image cannot be taken into account. It may therefore occur that consecutive display steps $V_{i-1}$ and $V_i$ can lead to no discernable improvement of the image resolution $R_{B,i}$ to the viewer.

FIG. 1 shows a typical course of image quality Q depending on the percentage $$l : 100 \cdot \frac{1}{1.024} \cdot \frac{\text{MByte}}{\text{kByte}} \cdot \frac{L}{L_{ges}} \text{ [\%]} \tag{10}$$

of the received data quantity L [kByte] of progressively coded images compressed in the JPEG 2000 format referring to the total data quantity $L_{total}$ to be transferred. As a statistical quality metric $$Q_1 : 100 \cdot \left(1 - \frac{e_i}{e_0}\right) \text{ [\%]} \tag{11a}$$

for the current image resolution $R_{B,i}$ is, in this instance, the mean square error (MSE)

$$e_1 := \frac{1}{\mu_{max} \cdot \nu_{max}} \cdot \sum_{\mu=1}^{\mu_{max}} \sum_{\nu=1}^{\nu_{max}} (v_{n,\mu\nu} - v_{i,\mu\nu})^2 \tag{11b}$$

(for $i \in \{1, 2, \ldots, N\}$)

between the final version $V_n$ of an image to be reconstructed whose image quality $Q_n$ ideally corresponds to the image quality $$Q_{orig} := 100\% \tag{11c}$$

of the transferred original image $V_{orig}$, and forms the basis of the respectively viewed version of a preview image $V_i$ at lower resolution and has been normalized to a quality range between 0% and 100%. In this case, $V_{N,\mu\nu}$ designates the pixel value of the original image Vorig to be transferred for the pixel (μ,v), $V_{i,\mu\nu}$ the pixel value of the i-th preview image $V_i$ for the pixel (μ, v) and $$e_0 \equiv e_{max} := \frac{1}{\mu_{max} \cdot \nu_{max}} \cdot \sum_{\mu=1}^{\mu_{max}} \sum_{\nu=1}^{\nu_{max}} V_{N,\mu\nu}^2 \tag{11d}$$

the maximum possible error. A quality metric of 100% provides the best available quality that can be achieved when the total image data quantity $L_{total}$ has been completely and successfully transferred. In this case (i=N) the mean square error $e_i$ is ideally equal to zero:

$$e_N = 0. \tag{11e}$$

An image quality of 0% exists when not image data has been transferred. In this case, (i=0) the mean square error ei achieves a maximum value of emax.

FIG. 2 shows another diagram for displaying a typical course of the statistical image quality Q depending on the percentage l of the received data quantity L of progressively coded image data compressed in the JPEG 2000 format referring to the total data quantity $L_{total}$ (in MByte) to be transferred. Here, in addition to the continual function course Q(l), the time $t_i$ of the decoding procedures $D_i$ with the associated percentage of the data quantity share Δll and image quality values $\Delta Q_i$ for a statistically equal quality improvement $$\Delta Q_i := h(\Delta l_i) = Q_i - Q_{i-1} (\text{for } i \in \{1, 2, \ldots N,\}) \tag{12}$$

of 10.00% per decoding step i has been specified, whereby both relationships $$Qi := +Q(l_i) \text{ and} \tag{12a}$$

$$Qi-1 := Q(l_{i-1}) \tag{12b}$$

give the image quality of the preview images $V_i$ and $V_{i-1}$. This shows that when there is a small portion Δll the quality increase $\Delta Q_i$ is high, i.e. the data quantity ΔLi that must be received between two improvement steps $D_{i-1}$ and $D_i$ is initially relatively small and increases with the increase of the existing data quantity List(j) at the point in time $t_j$.

As can be seen in FIG. 2, a large number N of decoding steps $D_i$ for a proportionally small quantity Δll of data within the framework of the determination of the decoding step $D_i$ described above in accordance with version 1 leads to an overload of the decoding system.

In practice, the courses of the image quality Q illustrated in FIGS. 1 and 2 result from statistically mean and normalized values of a random quality metric. The relationship indicated above between the image quality Q and the mean square error e is therefore understood for purely illustrative purposes. In fact, the normalized image quality courses Q(l) are stored in a data memory and are determined independently of the transfer.

SUMMARY OF THE INVENTION

An object of the present invention is to provide a technology that can be used to optimize the downloading of progressively coded image data.

The optimization concerns, for example, the amount of time and system resources used.

This object is achieved in accordance with the invention by a process and unit for gradual processing and, where necessary, display of progressively coded image data wherein the time spans $\Delta t_{w,i}$ between the time points $t_{i-1}$ and $t_i$ of consecutive decoding steps $D_{i-1}$ and $D_i$, during which the necessary decoded partial data quantities $\Delta L_i$ are made by the network user for the display of preview images in successively refined resolution $R_B$, are shortened and optimized with respect to a minimization of the total usage p of the decoding system. For this purpose, the data reception rates $R_i$ used in the invention for transferring the individual partial data quantities $\Delta L_i$ take into account the improvements $\Delta Q_i$ of the image quality Q achieved by the individual decoding steps $D_i$ and the temporary usage pi of the system components, for the determination of the decoding time point $t_i$. Instead of a measurement of the data reception rate $R_i$ and the achieved image quality improvements $\Delta Q_i$ during data transfer ensues, only a measurement of the execution times for the individual decoding steps $D_i$ are made, so as to avoid an overload of the system.

The wait times $\Delta t_{w,i}$ between the time points i−1 and $t_i$ of directly consecutive decoding steps $D_{i-1}$ and $D_i$ are thereby calculated in the invention by integrating statistical image quality parameters $$\Delta \overline{Q}_{v,i} := E\{\Delta Q_i\} \tag{13}$$

of received partial image data in such a way that the decoding steps $D_i$, which do not lead to a perceptible improvement $\Delta Q_{v,i}$ of the image quality Q showing the degree of resolution of an image to be reconstructed, are suppressed. Mean values are thereby used as threshold values for the perceptibility of a refinement of the image resolution $R_B$ that are derived from statistical experiments within the framework of psycho-optical measuring rows on a number of test individuals. The consideration of statistical quality parameters $\Delta Q_{v,i}$ of transferred images leads, in comparison to the previously described version 3, to a further reduction of the temporary usage pi of the decoding system.

DESCRIPTION OF THE PREFERRED EMBODIMENTS

The invention solution shall be explained in more detail in the following using the configuration examples in FIG. 3 thru 5.

Figure 5:
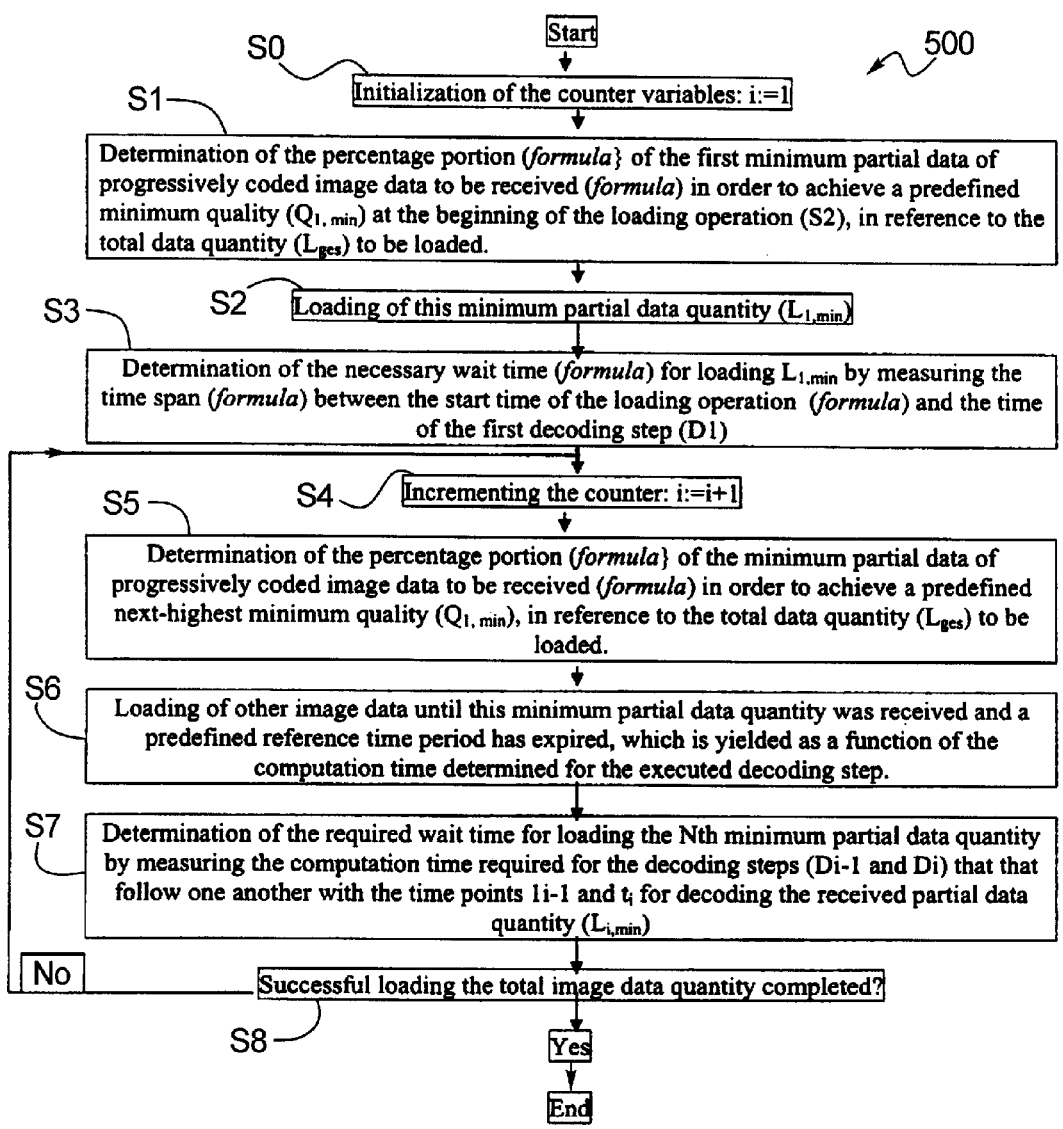
FIG. 5 is a flow chart to illustrate the invention process in which the wait times $\Delta t_{v,i}$ between the time points $t_{i-1}$ and $t_i$ of consecutive decoding steps $D_{i-1}$ and $D_i$ with integration of image quality parameters $\Delta Q_{v,i}$ of received partial image data is calculated in such a way that decoding steps Di that do not lead to a perceptible image improvement are suppressed.

The inventive process for the gradual decoding, archiving and graphic display of progressively coded image data is illustrated by the flow chart 500, which is reproduced in FIG. 5. After the initialization (S0) of a counter variable i for the decoding steps $D_i$ with the value (1:=1) the invention makes a determination (S1) of the percentage $\Delta l1$,min of the minimum quality Ql1,min of the first minimum partial data quantity $\Delta L_{1}$,min of progressively coded data to achieve a predefined minimum quality Q1,min to be received at the beginning of the loading process (S2), referring to the total data quantity $L_{total}$ to be loaded, whereupon this image data will be loaded (S2). Then the wait time $\Delta t_{w,1}$ for the loading of the first minimum partial data quantity $\overline{\Delta L}_{1}$,min will be determined by measuring the time span $\Delta t_{p,1}$ between the start time of the loading process (t0=0 S) and the time t1 of the first decoding step D1 (S3). As long as the total data quantity $L_{total}$ to be transferred has not been completely received then the following steps will be executed in a loop:

Incrementing (S4) of the counter variables 1 for the individual decoding steps Di by (1:=i+1), Determination (S5) of the percentage $\Delta l1$,min of the minimum partial data quantity $\Delta L1$,min of progressively coded image data to achieve a next-higher predefined minimum quality $Q_{i,min}$, referring to the total data quantity $L_{total}$ be loaded.

Loading (S6) of further image data until this minimum partial data quantity $\Delta L_{i,min}$ was received and a predefined reference duration $$\Delta t_{v,i} := (f \Delta t_{D,i=1}), \tag{14}$$

that serves as a function of the computation time $\Delta t_{p,i-1}$ determined for the preceding decoding step $D_{i-1}$, has expired, and Determination (S7) of the wait time $\Delta t_{w,i}$ for loading the i-th minimum partial data quantity $\Delta L_{i,min}$ through measurement of the computation time $\Delta t_{P,i}$ required for decoding this partial data quantity $\Delta L_{i,min}$ within the time span $\Delta t_{w,i}$ between the time $t_{i-1}$ of the immediately preceding decoding step and the time of the current decoding step $D_i$.

Figure 1:
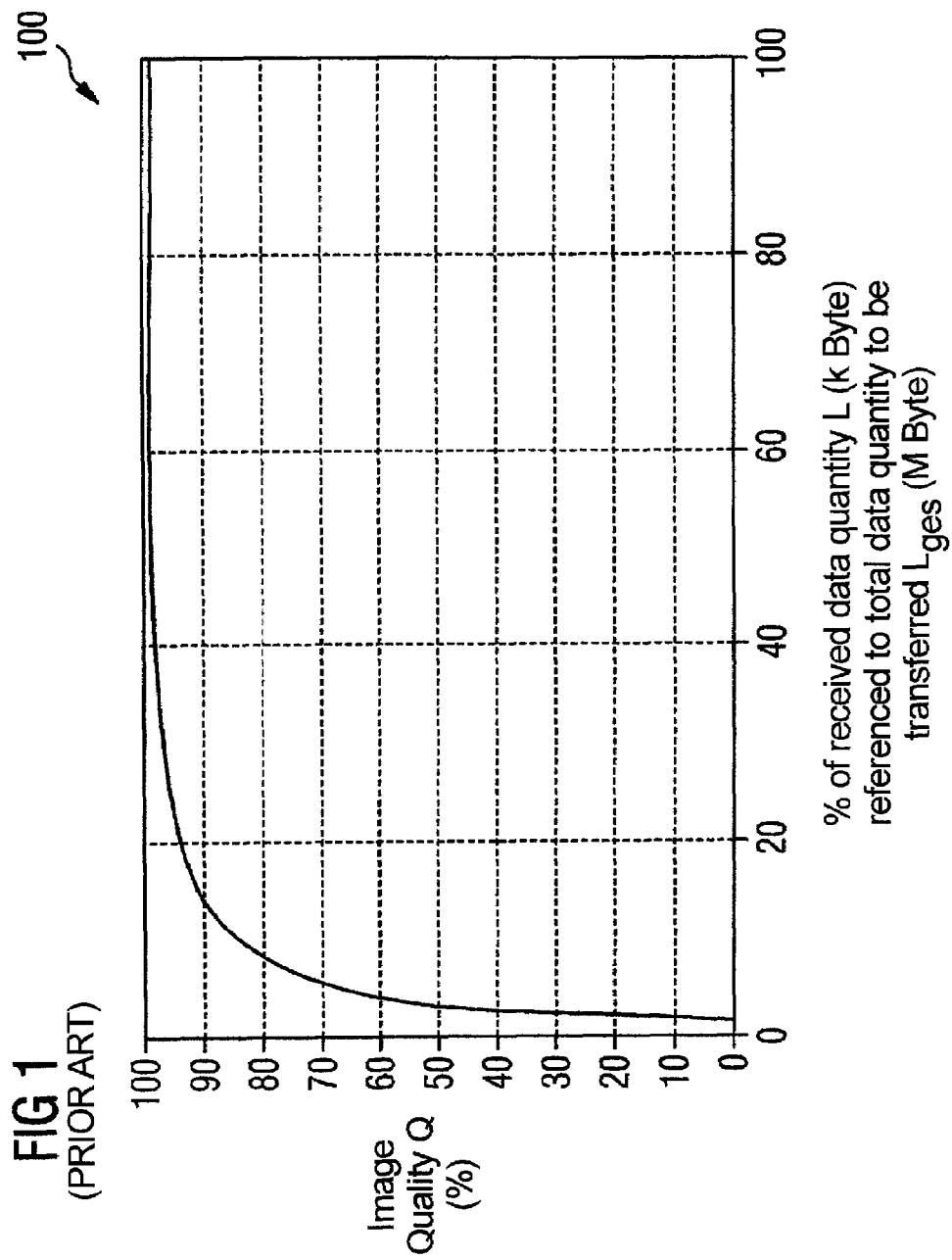
FIG. 1 is a diagram illustrating a typical course of the image quality Q showing the degree of resolution RB, depending on the percentage l of the received data quantity L of progressively coded image data compressed in the JPEG 2000 format, referring to the total data quantity $L_{total}$.
Figure 2:
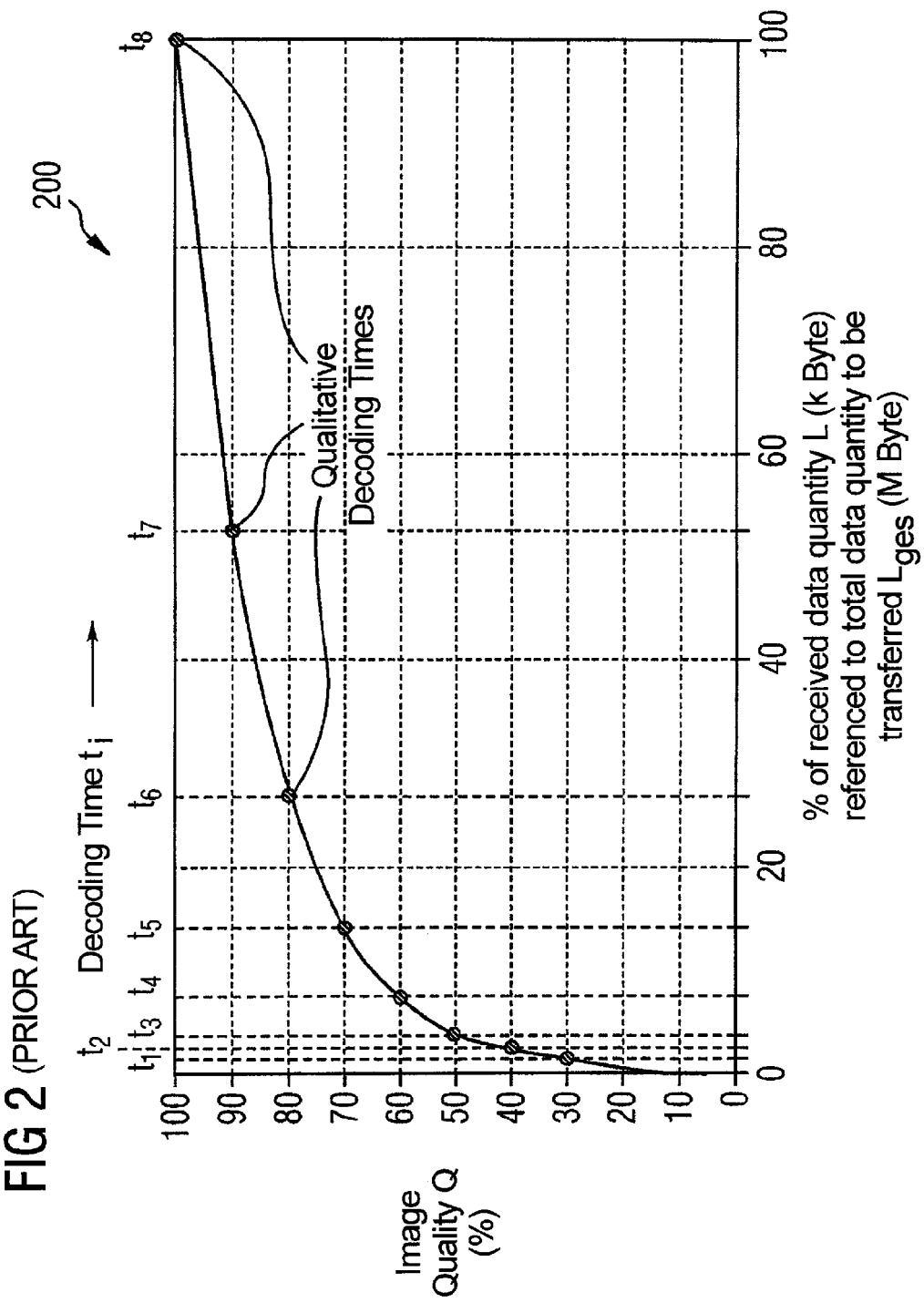
FIG. 2 is a further diagram of a typical course of the image quality Q depending on the percentage l of the received data quantity L of progressively coded image data compressed in the JPEG 2000 format, referring to the transferred total data quantity $L_{total}$, whereby, in addition to the continual function course Q(l), the time point $t_i$ of the decoding procedures $D_i$ with the associated percentage of data quantity $\Delta l,l$ and image quality values $\Delta Q_i$ for a statistically equal quality improvement $\Delta Q_i$ of 10.00% per decoding step is specified.
Figure 3:
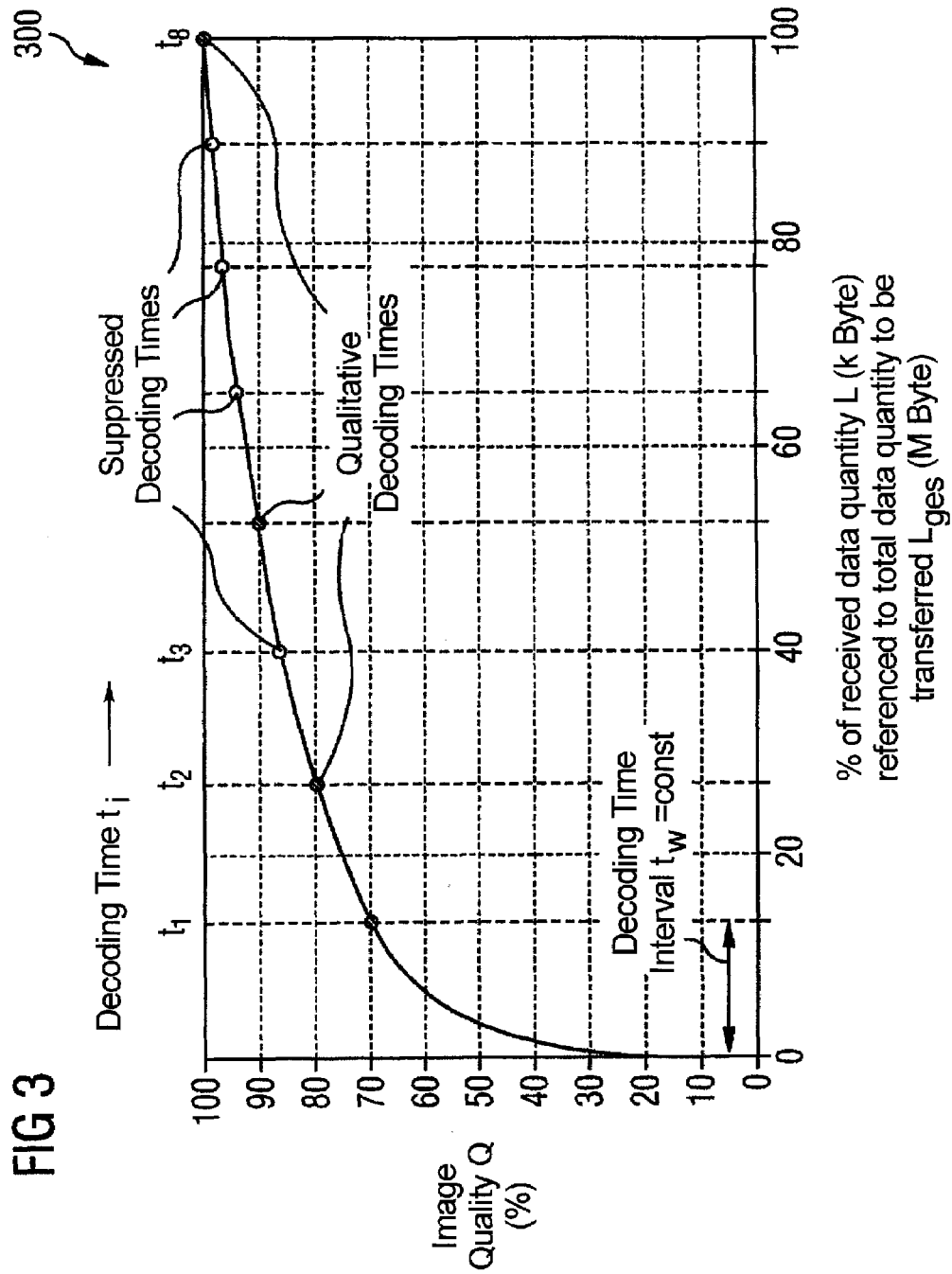
FIG. 3 is a diagram as in FIG. 2 wherein individual decoding time points $t_i$ are suppressed to reduce the number N of decoding steps by taking into account statistical quality parameters $\Delta Q_{v,i}$ of received image data.

FIG. 3 shows a typical course of the image quality Q depending on the percentage l of the received data quantity L of progressively coded image data compressed in the JPEG 2000 format, referring to the total image data to be transferred, referring to decoding steps $D_i$ n regular, constant time intervals $\Delta t_w$ are executed. The wait times $\Delta t_{v,i}$ between the time points $t_{i-1}$ and $t_i$ of directly consecutive decoding steps $D_{i-1}$ and $D_i$ are thereby calculated using statistical image quality parameters $\Delta Q_{v,i}$ of received partial image data in such a way (S3, S7) that the decoding steps $D_i$ that do not add any significant image improvement are suppressed.

The individual decoding steps $D_i$ in the invention occur at regular time intervals $\Delta t_w$ of equal duration, which result from the performance capacity and the current usage $P_i$ the system components 404 being used for decoding but only when the percentage $\Delta l$ of the increase $\Delta L_{i,min}$ of the data quantity, L referring to the total data quantity $L_{total}$, resulting from the individual decoding steps $D_i$ is sufficient to ensure a predefined minimum quality $\Delta Q_{i,min}$.

The parameters require for execution of the individual decoding steps $D_i$ encompass the set points $\Delta Q_{v,i}$ of the image quality improvements $\Delta Q_{v,l}$ is a percentage, each decoding step $D_i$ and the associated set-point portions $$\Delta \bar{l}_{v,i} := g(\Delta \bar{Q}_{v,i}) \tag{15}$$

of the partial data quantity $\Delta L_i$ to be received, referring to the total data quantity $\underline{L}_{total}$ to be transferred and are saved in a database 408a that may be configured freely.

To determine the decoding time points $t_i$ in the invention the data rates $R_i$ upon receiving the individual partial data quantities $\Delta_{L,i}$, the improvements $\Delta Q_i$ of the image quality Q generated by the individual decoding steps $D_i$ and the temporary usage $p_i$ of the system components 404 used for decoding are measured and evaluated.

As a set point $\Delta Q_{v,l}$ of the image quality improvements $\Delta Q_v$, $l$ as a percentage for each decoding step $D_i$, statistically mean values of the image quality improvements $\Delta Q_i$ to be expected in the individual decoding steps $D_i$ are used in the invention. Correspondingly, all the set point portions $\Delta l_{v,l}$ of the partial data quantity $\Delta L_i$ to be received for each decoding step $D_i$, respectively referring to the total data quantity $\underline{L}_{total}$ to be transferred, statistically mean values of the increases $\Delta ll$ as a percentage of the partial data quantity to be expected in the individual decoding steps $D_i$, respectively referring to the total data quantity $\underline{L}_{total}$ to be transferred.

Using the invention process yields a number of advantages:

- By suppressing decoding steps $D_i$ that do not lead to perceptible image improvements, there is a reduction in the burden P on the decoding system 404 compared to the current state of technology.
- By using regular, constant decoding intervals $\Delta t_{v,l}$ and the integration of image quality parameters $\Delta Q_{v,l}$ of received partial image data for calculating the wait time $\Delta tv, l$ between the times ti−1 and ti of directly consecutive decoding steps $D_{i-1}$ and $D_i$, a predefined maximum burden $P_{max}$ of the decoding system 404 is not exceeded.
- In addition, the calculation operations to be executed during the individual decoding steps $D_i$ are independent of the receiving data rates $R_i$, the result of which is that these sizes do not have to be known to the decoding system 404.

Figure 4:
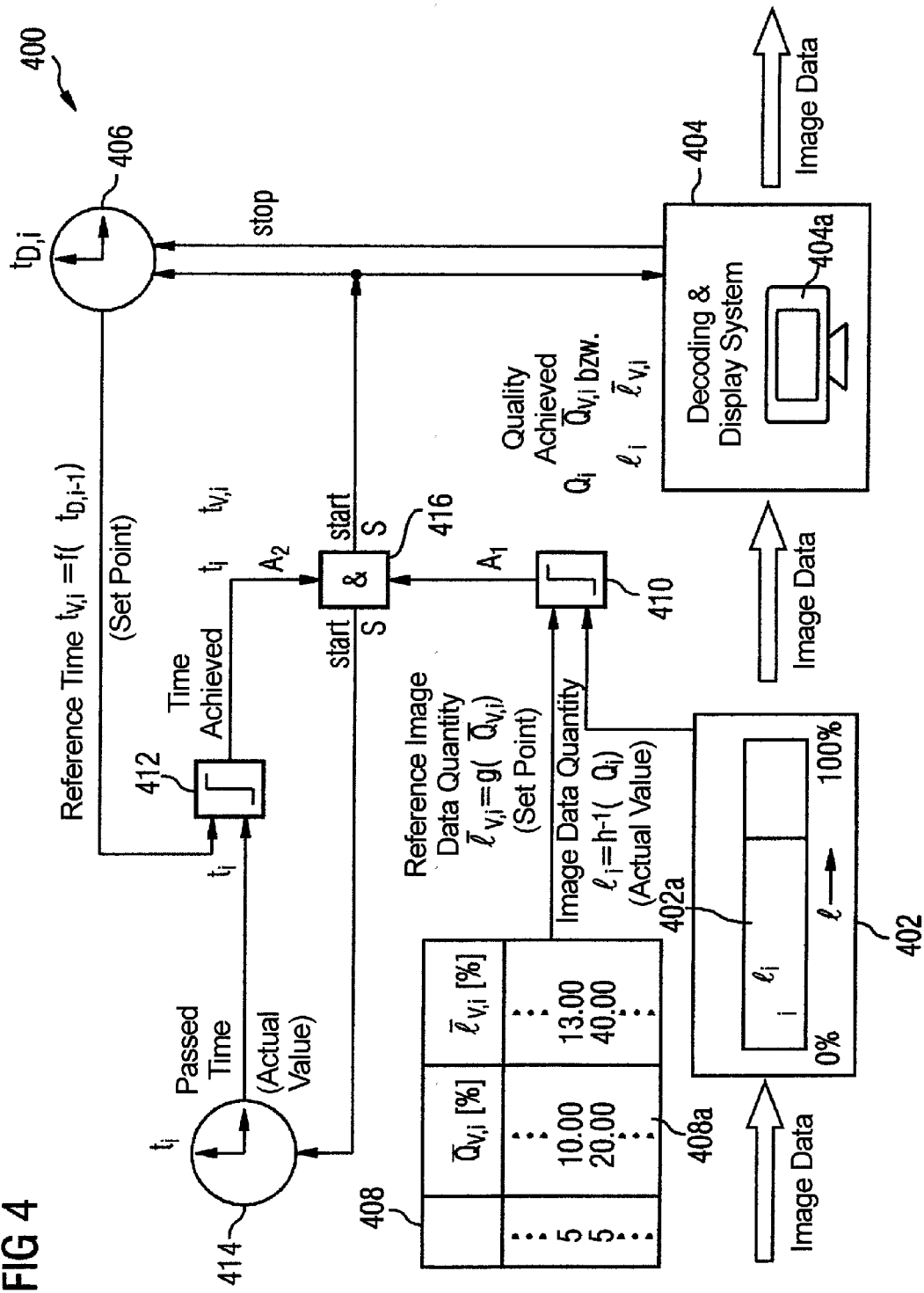
FIG. 4 is a block diagram of a functional unit for execution of a process for decoding progressively decoded image data taking into account statistical quality parameters $\Delta Q_{v,i}$ of received image data in accordance with a configuration example of the invention.

Another configuration example refers to the function unit 400 shown in FIG. 4, which serves for decoding, archiving and graphic display of progressively coded image data through successive increase of the image resolution $R_B$ with an increase in the data quantity L of the image data loaded in a receiving data carrier 402 and visualized using a display device 404a. In this instance, the receiving data carrier 402 has a fill display 402a, which calculates and specifies the accumulated actual value as a percentage fist of the data quantity L ist already loaded in the receiving data carrier 402, referring to the total data quantity to be transferred $L_{total}$. The function unit 400 is characterized by a decoding system 404, which decodes image data in N decoding steps $D_i$ received depending on statistical quality parameters $\Delta Q_{v,l}$ saved in the receiving data carrier 402.

The function unit 400 in the invention has access to a data carrier 408 that contains set points of the improvement of the image quality Q as a percentage per decoding step as well as the association set point portion of the partial data quantities $\Delta_{L,i}$ to be received, referring to the total quantity $L_{total}$, and a first threshold switch 410 whose output signal A1 specifies whether a loaded partial data quantity of image data to be loaded between the time points $t_{i-1}$ and $t_i$ of the preceding and current decoding steps $D_{i-1}$ and $D_i$, referring to the total data quantity $L_{total}$ to be loaded is sufficient to achieve a predefined threshold value for the improvement of image quality Q. Because A1 assumes the logical value of "one", the following must apply:

$$\Delta Q_1 \overset{1}{\geq} \Delta \bar{Q}_{v,i} \quad bzw. \tag{16a}$$

$$\Delta l_1 \overset{1}{\geq} \Delta \bar{l}_{v,i} \tag{16b}$$

In addition, the function unit 400 includes a first time measurement unit 406, which measures the required computation time within the wait time between times $t_{i-1}$ and $t_i$ of consecutive decoding steps $D_{i-1}$ and $D_i$ to decode a received partial data quantity through the decoding and display system 404, which serves as an output basis for calculating a reference time duration that is forwarded as a set point to the second threshold switch. A second time measurement unit 414 measures the actual required time duration for decoding the current partial data quantity through the decoding system 404 and delivers the measured actual value to the second threshold switch 412. The function unit 400 also has access to a second threshold switch 412 whose output signal A2 specifies whether a predefined wait time has passed after the previous decoding step Di for decoding the current partial data quantity, which results in a function of the execution time for decoding the immediately preceding partial data quantity through the decoding system 404. Because A2 assumes the logical value of "one", the following must apply:

$$\Delta t_1 \overset{1}{\geq} \Delta t_{v,i}. \tag{17}$$

Using an AND-gate 416, whose Boolean input signals are formed by the output signals A1 and A2 of both threshold switches 410 and 412, a control signal S is calculated, which delivers a start signal when a logical value of "one" is encountered that causes the decoding system 404 to execute a decoding step Di and also serves to start, undo or restart both time measurement units 406 and 414.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for processing data comprising the steps of:
    gradually processing progressively coded image data, for reconstructing an image, by successive increases of image resolution, in a plurality of directly consecutive decoding steps, thereby increasing data quantity of said image data loaded into a receiving data carrier; and
    calculating respective waiting times between respective points in time of said directly consecutive decoding steps using statistical image quality parameters as said image data are increasingly loaded, and suppressing decoding steps that do not result in an perceptible/noticeable improvement of said image resolution of said reconstructed image, by initializing a counter variable for the decoding steps by setting said counter variable to the value one, determining the percentage of a first minimum data quantity of the progressively coded image data to be loaded in said receiving data carrier for achieving a predetermined minimum guality at the beginning of said loading process, referenced to the total data guantity of said image data to be loaded into said receiving data carrier, and loading said first minimum partial guantity into said receiving data carrier, determining a waiting time for loading said first minimum data guantity by measuring a time span between starting of the loading process for loading said first minimum partial data guantity and a point in time of a first of said decoding steps, incrementing said counter variable for the individual decoding steps by one, determining a percentage of a minimum partial data guantity of said progressively coded image data to be loaded for achieving a next-higher predetermined minimum guality, referenced to said total data guantity, and loading data until said minimum partial data guantity has been loaded and a predetermined computation time has passed, said computation time being a function of said predetermined computation time for the preceding decoding step, determining the waiting time for loading each successive minimum partial data quantity by measuring the reguired computation time for loading each successive minimum partial data quantity from the point in time span of an immediately preceding decoding step to the point in time of a current decoding step, and repeating the above steps until said total image data guantity has been loaded.

2. A method as claimed in claim 1 wherein the step of determining said waiting times comprises (a) determining for each decoding step a data rate as said image data are loaded into said receiving data carrier, (b) determining improvement in a quality measure indicating a degree of image resolution achieved by the respective decoding steps and (c) determining current usage of components used for the decoding step.

3. A method as claimed in claim 1 comprising conducting the respective decoding steps at regular time intervals of identical duration if the percentage of increase of the loaded data quantity in the respective decoding steps is sufficient to ensure a predetermined minimum quality of the reconstructed image, referenced to a total data quantity to be loaded.

4. A method as claimed in claim 1 comprising storing parameters for executing the respective decoding steps in an arbitrarily configurable data base, including percentage set points for image quality improvements for each decoding step, and associated set point portions of the partial data quantities to be loaded, referenced to the total data quantity.

5. A method as claimed in claim 4 comprising determining said parameters using a statistical measuring technique.

* * * * *